United States Patent
Moffitt

(10) Patent No.: US 10,527,367 B2
(45) Date of Patent: Jan. 7, 2020

(54) HEAT EXCHANGE ASSEMBLY IN AN AIR TO AIR HEAT EXCHANGER

(71) Applicant: TRANE INTERNATIONAL INC., Davidson, NC (US)

(72) Inventor: Ronnie Moffitt, Harrodsburg, KY (US)

(73) Assignee: TRANE INTERNATIONAL INC., Davidson, NC (US)

( * ) Notice: Subject to any disclaimer, the term of this patent is extended or adjusted under 35 U.S.C. 154(b) by 25 days.

(21) Appl. No.: 15/236,046

(22) Filed: Aug. 12, 2016

(65) Prior Publication Data

US 2017/0045257 A1 Feb. 16, 2017

Related U.S. Application Data

(60) Provisional application No. 62/205,176, filed on Aug. 14, 2015.

(51) Int. Cl.
*F28D 9/00* (2006.01)
*F24F 12/00* (2006.01)
(Continued)

(52) U.S. Cl.
CPC ............ *F28F 19/006* (2013.01); *F24F 3/147* (2013.01); *F24F 12/006* (2013.01);
(Continued)

(58) Field of Classification Search
CPC ........ F24F 12/001; F24F 12/006; F24F 12/00; F24F 3/147; F28D 9/0093; F28D 21/0014; F28D 21/0015; F28F 19/006
(Continued)

(56) References Cited

U.S. PATENT DOCUMENTS 3,986,549 A * 10/1976 Huggins ................... F28F 3/00
165/145
4,327,803 A * 5/1982 Muellejans ............... F28D 9/00
165/145
(Continued)

FOREIGN PATENT DOCUMENTS

EP 1722170 A1 11/2006
JP 2005291617 A 10/2005
(Continued)

OTHER PUBLICATIONS

Extended European Search Report; European Patent Application No. 16184395.8, dated Jan. 30, 2017 (6 pages).

*Primary Examiner* — Christopher R Zerphey
*Assistant Examiner* — For K Ling
(74) *Attorney, Agent, or Firm* — Hamre, Schumann, Mueller & Larson, P.C.

(57) ABSTRACT

A heat exchange assembly in an air to air heat exchanger includes an arrangement, construction, and/or configuration of a combination of latent heat exchangers and sensible heat exchangers. The heat exchange assembly can minimize footprint required for the air to air heat exchanger, e.g. air handler, by avoiding the need for block offs and plenums, can support direct mounting of a bypass damper(s), can provide acceptable pressure drop ratings and provide good heat exchange efficiency and energy recovery performance. The arrangement and configuration of the sensible heat exchangers and latent heat exchangers of the heat exchange assembly have condensate management for example to provide frost protection.

20 Claims, 10 Drawing Sheets

(51) Int. Cl.
*F24F 3/147* (2006.01)
*F28F 19/00* (2006.01)
*F28D 21/00* (2006.01)
*F24F 13/22* (2006.01)

(52) U.S. Cl.
CPC ....... *F28D 9/0093* (2013.01); *F28D 21/0015* (2013.01); *F24F 2013/221* (2013.01)

(58) Field of Classification Search
USPC .................................................. 165/59, 166
See application file for complete search history.

(56) References Cited

U.S. PATENT DOCUMENTS

| | | | | |
|---|---|---|---|---|
| 4,971,137 A * | 11/1990 | Thompson | ............ | F24F 12/006 165/166 |
| 5,771,707 A | 6/1998 | Lagace et al. | | |
| 8,746,327 B2 * | 6/2014 | Mooij | ................... | F24F 12/006 165/103 |
| 2007/0158049 A1 * | 7/2007 | Kim | ....................... | F24F 12/006 165/48.1 |
| 2011/0036541 A1 * | 2/2011 | Takada | ................... | F24F 12/006 165/59 |
| 2014/0264968 A1 * | 9/2014 | Erb | ....................... | F24F 12/006 261/100 |
| 2015/0021001 A1 * | 1/2015 | Van Heeswijk | ...... | F28D 9/0062 165/109.1 |

FOREIGN PATENT DOCUMENTS

| | | | | |
|---|---|---|---|---|
| JP | 2009281707 A | 12/2009 | | |
| KR | 101270510 B1 * | 6/2013 | | |
| WO | 2011/132994 A2 | 10/2011 | | |
| WO | WO 2011132999 A2 * | 10/2011 | ................ | E06B 7/02 |
| WO | WO-2012167366 A1 * | 12/2012 | ........... | B01D 53/228 |

* cited by examiner

*Fig. 1A*
(Prior Art)
*Fig. 1B*
(Prior Art)
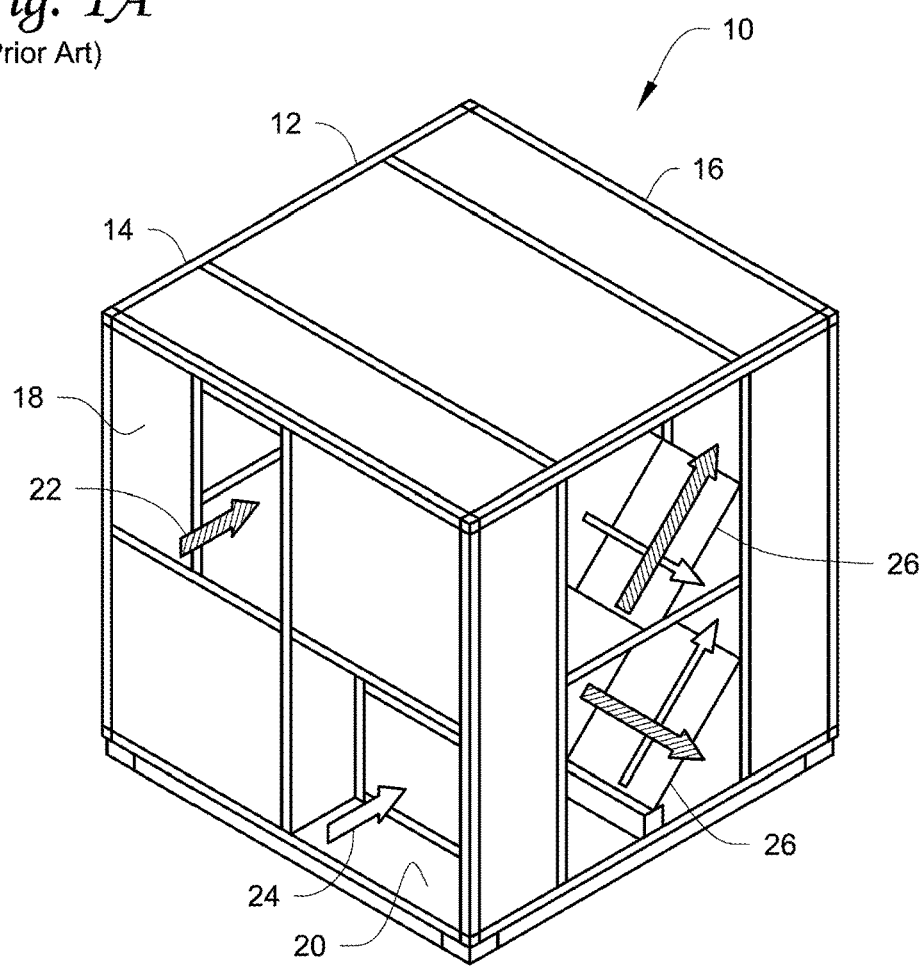
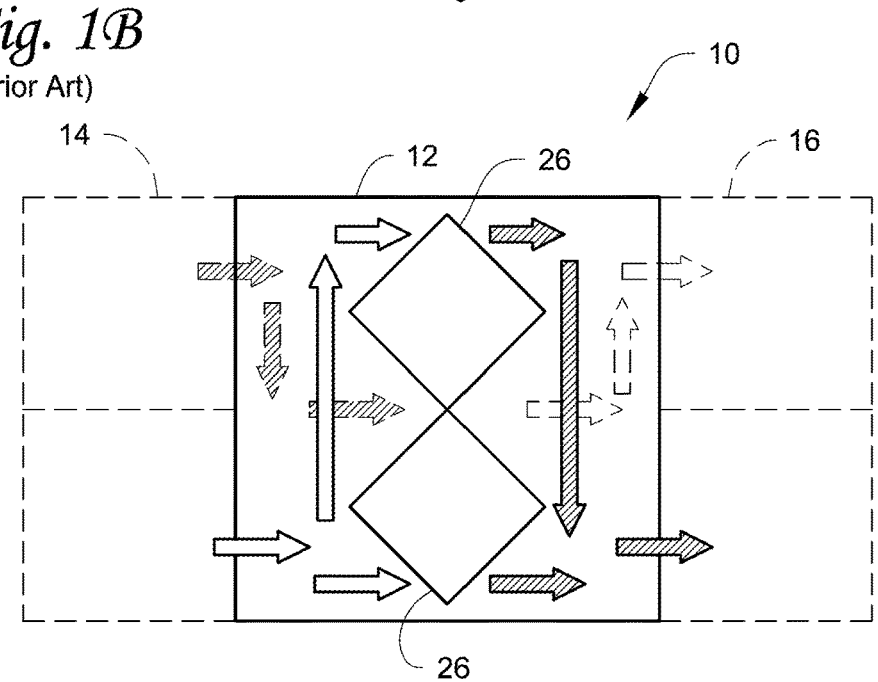

HEAT EXCHANGE ASSEMBLY IN AN AIR TO AIR HEAT EXCHANGER

FIELD

Embodiments disclosed herein relate generally to a heat exchange assembly in an air to air heat exchanger. In particular, methods, systems and apparatuses are disclosed that are directed to an arrangement, construction, and/or configuration of a combination of latent heat exchangers and sensible heat exchangers, for example in an air to air heat exchanger, such as for example in an air handler in a refrigeration circuit, such as for example an heating, venting, and air conditioning (HVAC) system and/or unit, such as for example a rooftop type of HVAC system and/or unit.

BACKGROUND

Fixed plate heat exchangers are used in air to air heat exchangers, such as may be employed in an air handler unit of an HVAC system.

SUMMARY

Embodiments disclosed herein relate generally to a heat exchange assembly in an air to air heat exchanger. In particular, methods, systems and apparatuses are disclosed that are directed to an arrangement, construction, and/or configuration of a combination of latent heat exchangers and sensible heat exchangers.

In an embodiment, the heat exchange assembly may be implemented, for example in an air to air heat exchanger. In an embodiment, the air to air heat exchanger is in an air handler of a refrigeration circuit, such as for example a HVAC system and/or unit. In an embodiment, the HVAC system and/or unit is for example a rooftop type of HVAC system and/or unit.

In an embodiment, a heat exchange assembly includes one or more sensible heat exchangers and one or more latent heat exchangers. The one or more sensible heat exchangers and one or more latent heat exchangers are arranged and configured to make up a first inlet face configured to receive a first stream of air. The one or more sensible heat exchangers and one or more latent heat exchangers are configured to make up a second inlet face configured to receive a second stream of air different from the first stream of air. The one or more sensible heat exchangers and one or more latent heat exchangers are configured to make up a first outlet in fluid communication with the first inlet face. The one or more sensible heat exchangers and one or more latent heat exchangers are configured to make up a second outlet in fluid communication with the second inlet face. The one or more sensible heat exchangers and one or more latent heat exchangers include flow channels between the first inlet face and the first outlet, and between the second inlet face and the second outlet. The flow channels between the first inlet face and the first outlet are in a heat exchange relationship with the flow channels between the second inlet face and the second outlet, and are configured such that both sensible heat exchange and latent heat exchange occurs through the heat exchange assembly.

In an embodiment, one or more of the sensible heat exchangers and one or more of the latent heat exchangers include both the flow channels between the first inlet face and the first outlet and the flow channels of between the second inlet face and the second outlet.

In an embodiment, the flow channels between the first inlet face and the first outlet are in a heat exchange relationship with the flow channels between the second inlet face and the second outlet, and are configured such that both sensible heat exchange and latent heat exchange occurs through the flow channels between the first inlet face and the first outlet and through the flow channels between the second inlet face and the second outlet.

In an embodiment, the first inlet face includes at least one latent heat exchanger exposed, and the second inlet face includes at least one latent heat exchanger exposed.

In an embodiment, the first outlet includes at least one latent heat exchanger, and the second outlet includes at least one latent heat exchanger.

In an embodiment, the one or more of the sensible heat exchangers and one or more of the latent heat exchangers are arranged and configured as an assembled block of heat exchangers. In an embodiment, the one or more of the sensible heat exchangers and one or more of the latent heat exchangers are arranged and configured as a combination to respectively include a same number exposed to the first inlet face as exposed to the second inlet face and to respectively include a same number exposed to the first outlet as exposed to the second outlet. In an embodiment, the one or more of the sensible heat exchangers and one or more of the latent heat exchangers are arranged and configured as a mathematically squared number when viewed from a side profile.

In an embodiment, the first air stream is outdoor air, where the first inlet face is configured to receive the outdoor air. In an embodiment, the second air stream is exhaust air, where the second inlet face is configured to receive the exhaust air.

In an embodiment, the one or more sensible heat exchangers are constructed as fixed plate heat exchangers with plates that are separated and sealed to form the flow channels therebetween. In an embodiment, the fixed plates are metal plates, such as for example aluminum, or plastic or composite plates, where the plate surfaces provide for heat exchange to occur.

In an embodiment, the one or more latent heat exchangers are constructed as plates, layers, or membranes, or the like that are separated and sealed to form the flow channels therebetween. The plates, layers, and/or membranes, or the like are configured to include permeable surfaces that promote molecular transfer of water vapor from one side of the plate to another side of the plate. In an embodiment, the one or more latent heat exchangers include corrugations between the layers that provide additional channels within the flow channels between the layers. In an embodiment, surfaces from any one of the corrugations, the layers and/or plates provide the permeable surfaces that promote molecular transfer of water vapor from one side of the layer and/or plate to the other.

In an embodiment, the one or more sensible heat exchangers and one or more latent heat exchangers are arranged and configured to provide condensate management for example to provide frost prevention. In an embodiment, one or more latent heat exchangers is disposed proximate an area the first air stream enters the heat exchange assembly and proximate an area the second air stream exits the heat exchange assembly. In an embodiment, the one or more latent heat exchangers provide frost prevention for example at or about $-10°$ F., at or about $0°$ F. to at or about $-10°$ F.

In an embodiment, a latent heat exchanger is disposed at a vertex shared by the first inlet face and the second outlet. In an embodiment, the vertex is a location relative to a block arrangement of one or more sensible heat exchangers and one or more latent heat exchangers. In an embodiment, a latent heat exchanger is disposed at a vertex shared by the first inlet face and the second inlet face.

In an embodiment, one or more of the inlet faces and one or more of the outlets include a bypass damper thereon. In an embodiment, one or more of the inlet faces and one or more of the outlets includes a face damper. It will be appreciated that the unit with which the heat exchanger assembly is associated may include a bypass air path external to the heat exchanger assembly in additional to having a bypass damper.

In an embodiment, the heat exchange assembly is configured for use in systems and/or units that provide over 1000 cubic feet per minute (cfm) of air flow, provide at or about or over 2000 cfm, provide at or about or over 2300 cfm, and in some instances provide at or about or over 32000 cfm.

In an embodiment, an air handler unit includes an enclosure for the heat exchange assembly of any one or more of the paragraphs. In an embodiment, the air handler unit is a part of a rooftop type of HVAC system.

In an embodiment, a method of flowing streams of air through a heat exchange assembly includes directing a first and a second air stream to promote heat exchange through flow passages in a heat exchange assembly as per any one or more of the paragraphs.

In an embodiment, a method for preventing frost on a heat exchange assembly includes directing a first and a second air stream to promote heat exchange through flow passages in a heat exchange assembly as per any one or more of the paragraphs. In an embodiment, the method includes managing condensate proximate the first inlet face and the second outlet.

DRAWINGS

These and other features, aspects, and advantages of the heat exchange assembly will become better understood when the following detailed description is read with reference to the accompanying drawing, wherein:

FIG. 1A is a perspective view of an example of a known heat exchange assembly, where multiple heat exchanger cores are arranged with additional plenums and block offs.

FIG. 1B is a side schematic view showing air flow through the heat exchange assembly of FIG. 1A.

DETAILED DESCRIPTION

Figure 2A:
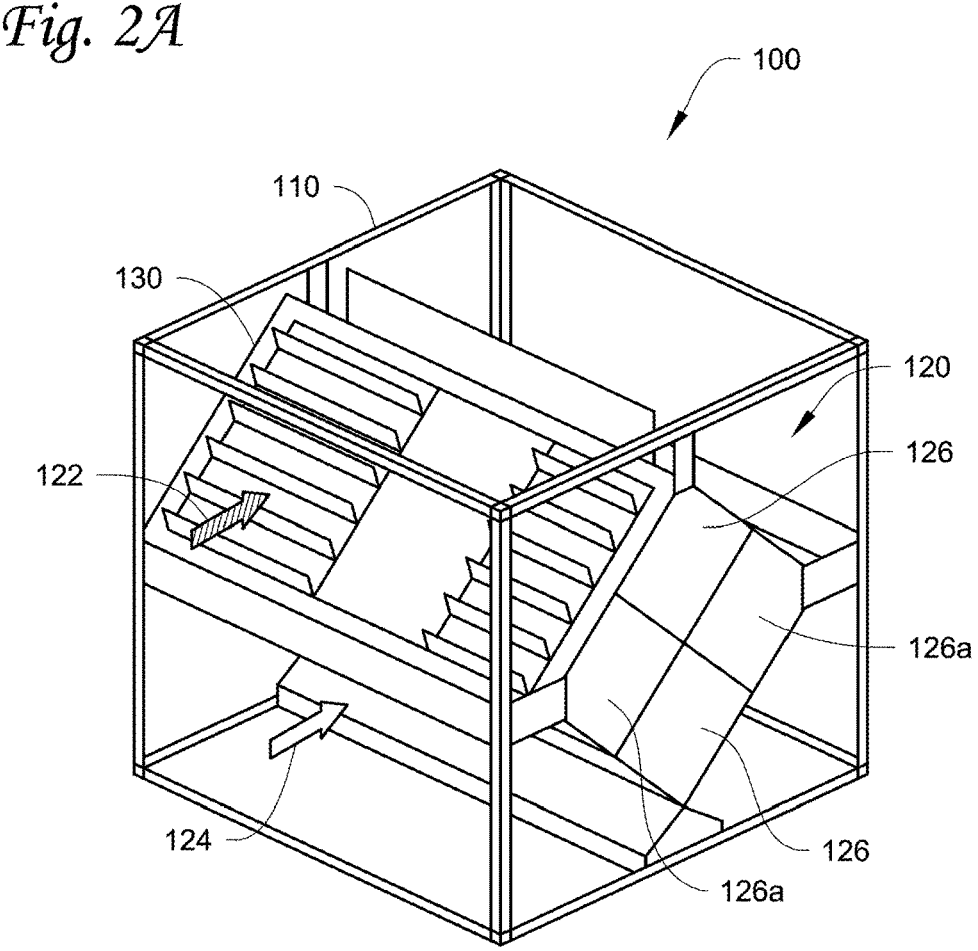
FIG. 2A is a perspective view of an embodiment of a heat exchange assembly.

Embodiments disclosed herein relate generally to a heat exchange assembly in an air to air heat exchanger. In particular, methods, systems and apparatuses are disclosed that are directed to an arrangement, construction, and/or configuration of a combination of latent heat exchangers and sensible heat exchangers.

In an embodiment, the heat exchange assembly may be implemented for example in an air to air heat exchanger. In an embodiment, the air to air heat exchanger is in an air handler of a refrigeration circuit, such as for example a HVAC system and/or unit. In an embodiment, the HVAC system and/or unit is for example a rooftop type of HVAC system and/or unit.

FIG. 1A is a perspective view of an example of a known heat exchange assembly 10 with additional plenums and block offs 18, 20. The assembly is primarily a latent heat exchanger assembly with a latent heat exchanger cores assembly. It will be appreciated that the assembly 10 can be made of sensible heat exchangers. The assembly 10 as shown includes an enclosure 12 with a heat exchange core assembly 26 therein. The assembly 10 also requires additional casings 14, 16 to provide transitional spacing for the relative amount of area restricted by the transition panels and block offs, e.g. at 18, 20. In such known designs, it is not feasible to include a bypass damper internal of the enclosure 12 and disposed on the core assembly 26. This is due to the block offs needed to direct the incoming air streams 22, 24 entering the assembly 10 (e.g. outdoor air and exhaust return air, respectively).

FIG. 1B is a side schematic view showing air flow through the heat exchange assembly of FIG. 1A. As shown, while the transition panels and block offs, e.g. at 18, 20, help to direct flow through the assembly 10, a larger footprint is required in order to transition the air flow into the enclosure 12. Such transitions may add about for example 1.0 to 1.5 iwc (inches water column) of pressure drop, such as for example in a system operating at or about 2000 cfm and higher.

FIG. 2A is a perspective view of an embodiment of a heat exchange assembly 100 as per the inventive concepts of the Applicant. As shown, the heat exchange assembly 100 includes a core assembly 120 made up of combination of sensible heat exchangers 126 and latent heat exchangers 126a (which may also provide some sensible heat exchange).

Referring to FIGS. 2A-2B, 3, and 4, in an embodiment, the heat exchange assembly 100 includes one or more sensible heat exchangers 126 and one or more latent heat exchangers 126a. The one or more sensible heat exchangers 126 and one or more latent heat exchangers 126a are arranged and configured to make up a first inlet face 132 (see FIG. 4) configured to receive a first stream of air 122. The one or more sensible heat exchangers 126 and one or more latent heat exchangers 126a are configured to make up a second inlet face 134 (see FIG. 4) configured to receive a second stream of air 124 different from the first stream of air 126.

In an embodiment, the first air stream 122 is outdoor air, where the first inlet face 132 is configured to receive the outdoor air. In an embodiment, the second air stream 124 is exhaust air, where the second inlet face 134 is configured to receive the exhaust air.

The one or more sensible heat exchangers 126 and one or more latent heat exchangers 126a are configured to make up a first outlet 138 (see FIG. 4) in fluid communication with the first inlet face 132. The one or more sensible heat exchangers 126 and one or more latent heat exchangers 126a are configured to make up a second outlet 136 (see FIG. 4) in fluid communication with the second inlet face 134. The one or more sensible heat exchangers 126 and one or more latent heat exchangers 126a include flow channels 140 (see FIG. 3) between the first inlet face 132 and the first outlet 138, and flow channels 150 (see FIG. 3) between the second inlet face 134 and the second outlet 136. The flow channels 140 between the first inlet face and the first outlet are in a heat exchange relationship with the flow channels 150 between the second inlet face and the second outlet, and are configured such that both sensible heat exchange and latent heat exchange occurs through the heat exchange assembly.

Figure 3:
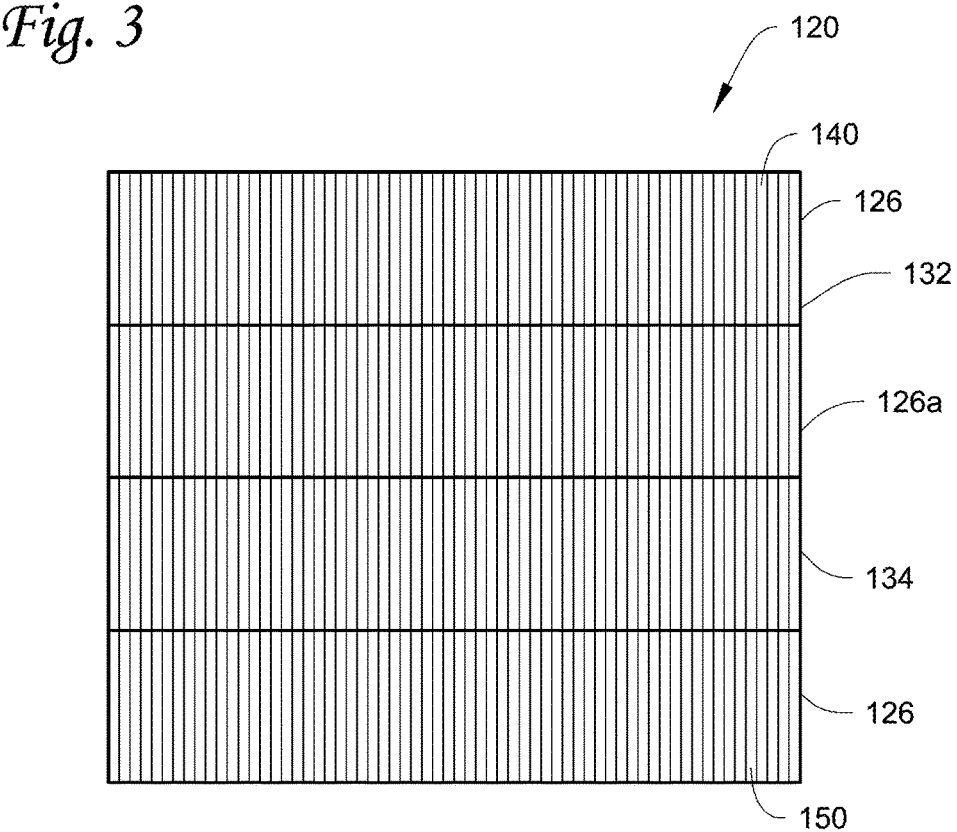
FIG. 3 is a face view of an embodiment of the inlet face of a heat exchanger assembly, such as may be implemented in the heat exchange assembly of FIGS. 2A-B.

In an embodiment, the one or more sensible heat exchangers 126 are constructed as fixed plate heat exchangers with plates that are separated and sealed to form the flow channels 140 therebetween (see e.g. FIG. 3). In an embodiment, the fixed plates are metal plates, such as for example aluminum, or plastic or composite plates, where the plate surfaces provide for heat exchange to occur. In an embodiment, the one or more sensible heat exchangers 126 are relatively flat plates. In an embodiment, the plates form a stack, aligned parallel to each other, and separated by a certain spacing. The two air streams flow through the channels formed between the flat plates. Each airstream flows into alternating channels (e.g., supply air in one channel, return air in the next, supply in the one after that, etc.). In an embodiment, while the air streams pass near each other, they are intended not to physically mix.

In an embodiment, the one or more latent heat exchangers 126a are constructed as plates, layers, or membranes that are separated and sealed to form the flow channels 150 therebetween (see e.g. FIG. 3). The plates, layers, membranes, or the like are configured to include permeable surfaces that promote molecular transfer of water vapor from one side of the plate to another side of the plate. In an embodiment, the one or more latent heat exchangers 126a include corrugations between the layers that provide additional channels within the flow channels between the layers. It will be appreciated that the sensible heat exchangers, e.g. 126, may include corrugations between the plates that provide additional channels within the flow channels between the plates. In an embodiment, surfaces from any one of the corrugations, the layers and/or plates provide the permeable surfaces that promote molecular transfer of water vapor from one side of the layer and/or plate to the other. It will also be appreciated that corrugations as specifically shown herein may not be used and/or may be modified. Other layers, wall structures and configurations between the plates may provide the additional surfaces and/or channels, and which in some cases can also provide the permeable surfaces may be employed as suitable, desired, and/or needed.

Figure 9:
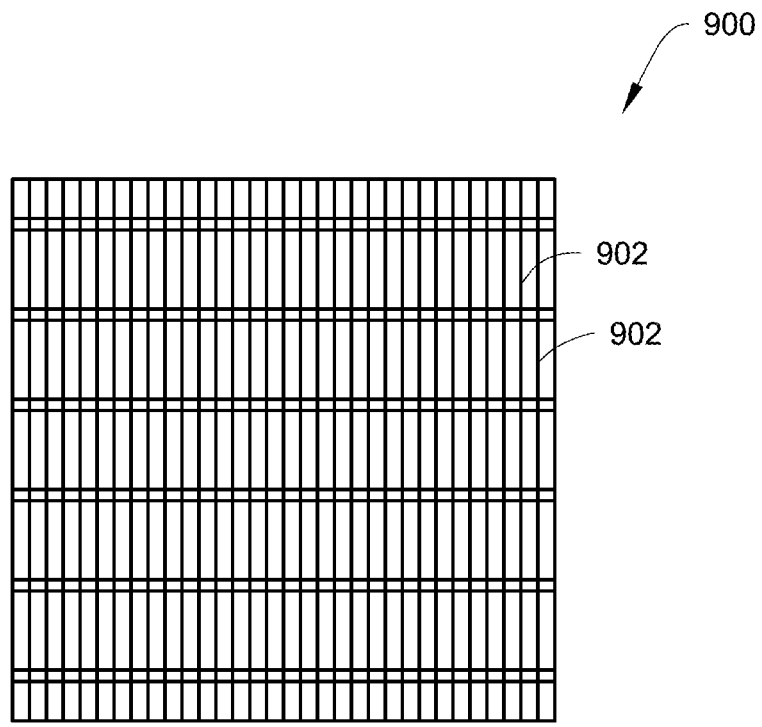
FIG. 9 is a picture of an example of a sensible heat exchanger which may be in the form of a core for assembly with one or more other heat exchanger cores.
Figure 10:
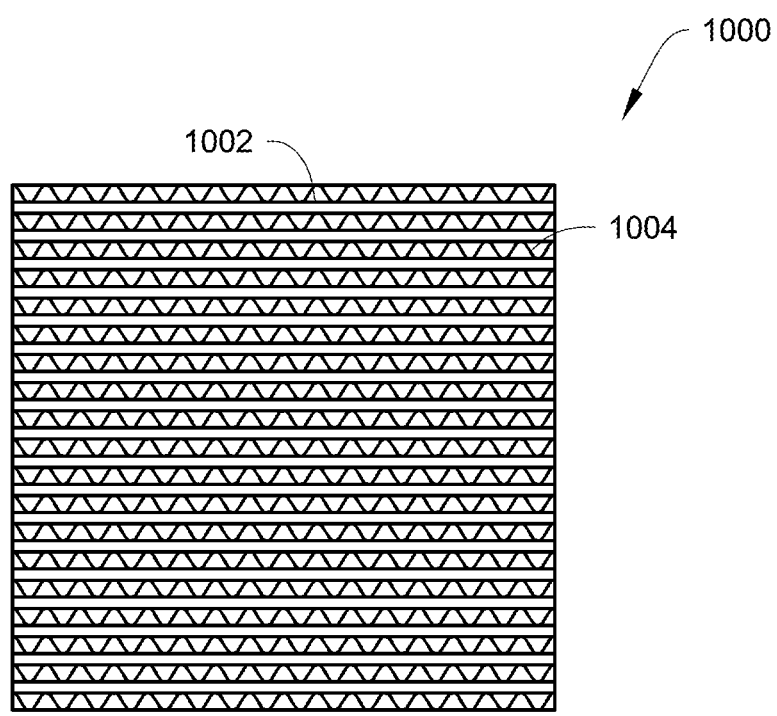
FIG. 10 is a picture of an example of a latent heat exchanger which may be in the form of a core for assembly with one or more other heat exchanger cores.

FIGS. 9 and 10 respectively show an example of a sensible heat exchanger 900 with plates 902 and an example of a latent heat exchanger 1000 (showing plates 1002 or layers and the corrugations 1004).

In FIG. 2A, the heat exchange assembly can provide a smaller footprint that can accommodate a bypass damper 130 on the core assembly 120 and within the main enclosure 110. In an embodiment, one or more of the inlet faces and outlets can include a bypass damper (e.g. 130) thereon, which may also be referred to as a face damper. In an embodiment, the damper 130 shows bypass going through the center of exchanger.

In an embodiment, the damper 130 may be constructed as a partial blocking structure on the face of any one or more of the sensible heat exchangers and latent heat exchangers exposed on the inlet faces. The partial blocking on the inlet face(s) may help improve performance. For example, depending on the relative humidity conditions, portions of a latent heat exchange(s) or a sensible heat exchanger(s) may be partially blocked. Blocking off a portion of one or more of the latent and/or sensible heat exchangers would help to direct more air through the other of the latent or sensible heat exchangers. For example, under conditions of relatively higher relative humidity and/or increased relative humidity, it may be desirable to expose more of the latent heat exchange capability, which can provide more and/or better molecular transfer from one side to the other. For example, a portion of the sensible heat exchanger(s) may be blocked, where more surface of the latent heat exchanger(s) is open or exposed. As another example, under conditions of relatively lower relative humidity and/or decreased relative humidity, it may be desirable to partially block the latent heat exchanger(s) since moisture may be relatively low (e.g. when air is dry outside and relative humidity is low.

In an embodiment, the partial blocking may be achieved by closing one or more of the dampers of the damper 130. In an embodiment, this can achieve partial face damping across a width of one or more of the latent heat exchanger(s) and the sensible heat exchanger(s). In an embodiment, the specific damper 130 may not be used and a portion of the housing or enclosure 110 may be used to provide the partial block structure (see e.g. item 20 in FIG. 1A), such as for example by putting a strip of material across the width of the enclosure that would block part of the heat exchanger. See e.g. cross bar of the enclosure 110 in FIG. 2A across the width of the latent heat exchanger 126a on the front of the unit.

In FIG. 2A, for example, no transitional panels or block offs are required (see items 14, 16, 18, and 20 in FIGS. 1A and 1B), which can help to minimize the footprint of the assembly 100 and reduce pressure drop or losses, since transitional space is not needed. Further energy transfer and recovery may be obtained through the exposure of more of the core assembly 120 by not using transition panels and block offs.

Figure 2B:
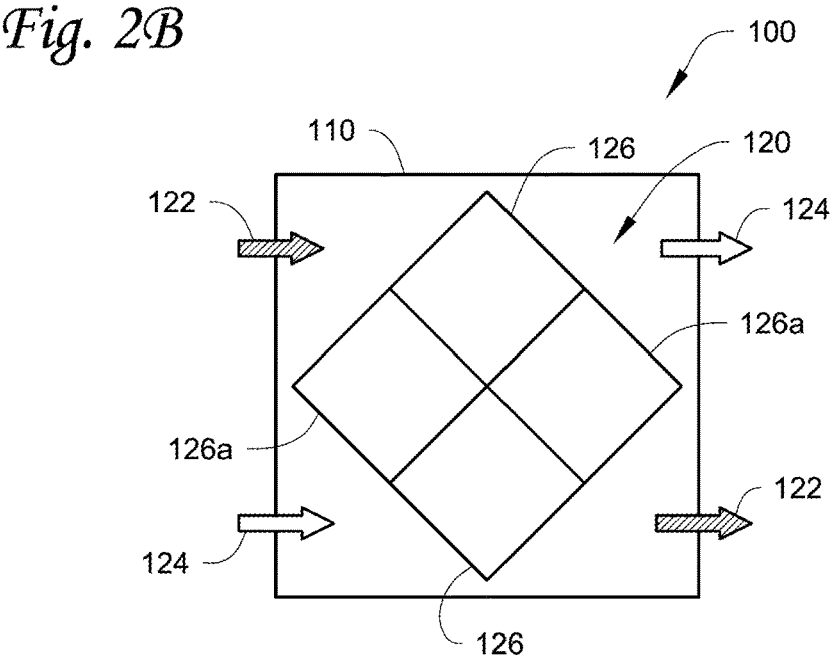
FIG. 2B is a side schematic view showing air flow through the heat exchange assembly of FIG. 2A.

FIG. 2B is a side schematic view showing air flow through the heat exchange assembly 100 of FIG. 2A.

FIG. 3 is a face view of an embodiment of the inlet face 132 of core assembly 120 used in the heat exchanger assembly 100.

Figure 4:
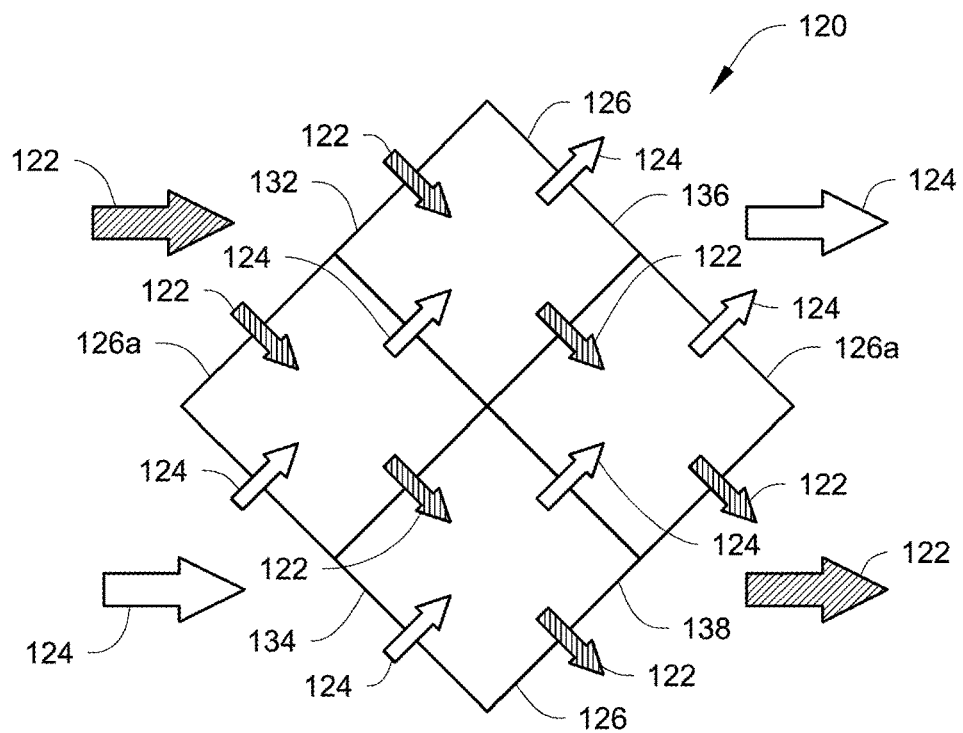
FIG. 4 is a side schematic view of air flow through sensible heat exchangers and latent heat exchangers configured and arranged for example as in FIG. 3.

FIG. 4 is a side schematic view of air flow through the sensible heat exchangers 126 and the latent heat exchangers 126a.

In an embodiment, one or more of the sensible heat exchangers 126 and one or more of the latent heat exchangers 126a include both the flow channels 140 between the first inlet face 132 and the first outlet 138 and the flow channels 150 of between the second inlet face 134 and the second outlet 136.

In an embodiment, the flow channels 140 between the first inlet face 132 and the first outlet 138 are in a heat exchange relationship with the flow channels 150 between the second inlet face 134 and the second outlet 136, and are configured such that both sensible heat exchange and latent heat exchange occurs through the flow channels 140 between the first inlet face 132 and the first outlet 138 and through the flow channels 150 between the second inlet face 134 and the second outlet 136.

In an embodiment, the first inlet face 132 includes at least one latent heat exchanger 126a exposed, and the second inlet face includes at least one latent heat exchanger 126a exposed.

In an embodiment, the first outlet 138 includes at least one latent heat exchanger 126a exposed and the second outlet 136 includes at least one latent heat exchanger 126a exposed. Herein, "exposed" means that the respective heat exchanger (whether sensible or latent) may be seen from a face view or end view, e.g., of the respective outlet(s).

In an embodiment, one or more of the sensible heat exchangers 126 and one or more of the latent heat exchangers 126a are arranged and configured as an assembled block of heat exchangers. In an embodiment, the one or more of the sensible heat exchangers 126 and one or more of the latent heat exchangers 126a are arranged and configured as a combination to respectively include a same number exposed to the first inlet face 132 as exposed to the second inlet face 134 and to respectively include a same number exposed to the first outlet 138 as exposed to the second outlet 136 (e.g. as shown in the Figs.). In an embodiment, the total number of the one or more of the sensible heat exchangers 126 and one or more of the latent heat exchangers 126a are arranged and configured as a mathematically squared number when viewed from a side profile. For example, the core assembly 120 of FIGS. 2 to 4 shows a 2×2 relationship having two (2) sensible heat exchangers 126 and two (2) latent heat exchangers 126a. It will be appreciated that the number, orientation, arrangement, and/or configuration of sensible and latent heat exchangers may vary as desired and/or suitable. For example, as shown in FIGS. 5B and 5C (further described below), there is a mathematically squared number of total heat exchangers, counting both sensible and latent heat exchangers. However, the number of sensible heat exchangers is higher relative to the number of latent heat exchangers.

Figure 5A:
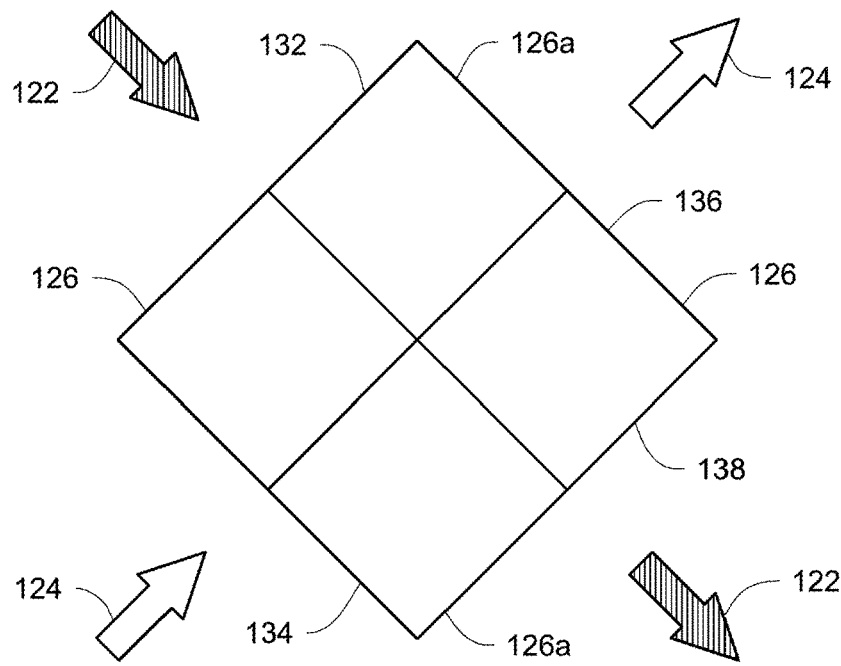
FIGS. 5A to 5C are side schematic views of air flow through different configurations, arrangements, and orientations of sensible heat exchangers and latent heat exchangers.
Figure 5B:
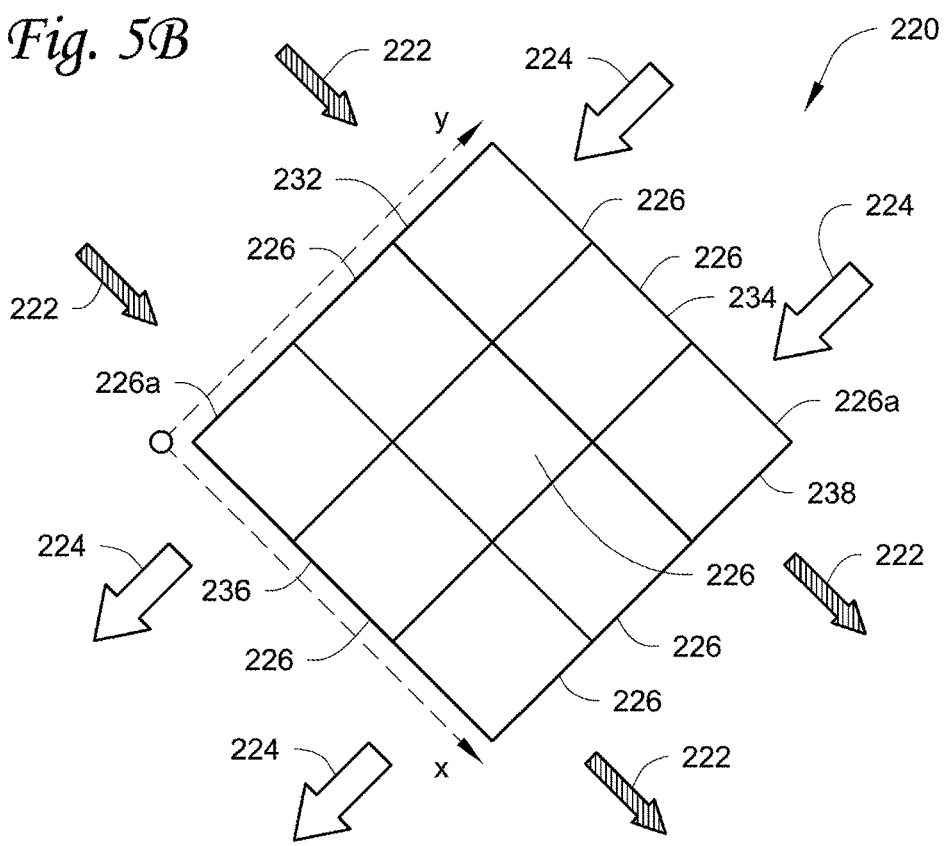
Figure 5C:
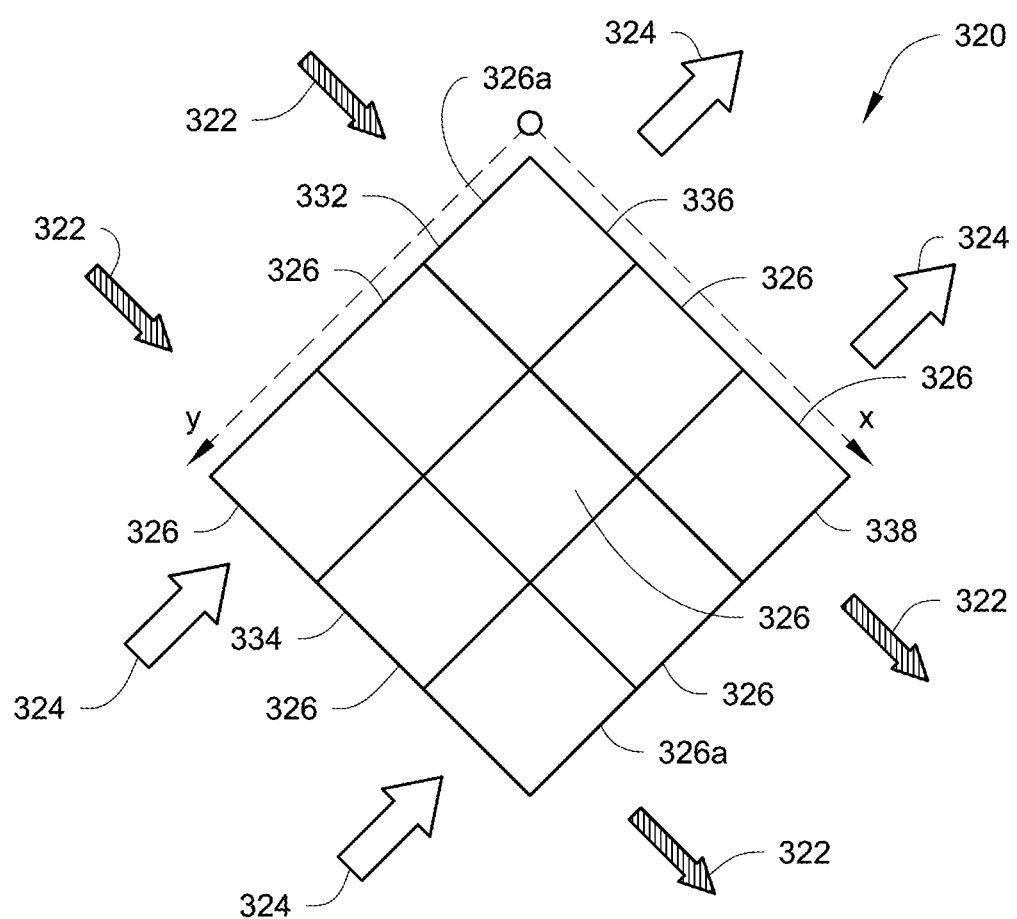

FIGS. 5A to 5C are side schematic views of air flow through different configurations, arrangements, and orientations of sensible heat exchangers and latent heat exchangers in various core assemblies.

FIG. 5A shows a similar core as the core 120 of FIG. 2A, but in a different orientation relative to the outdoor and exhaust air flows 122, 124. Different from FIG. 2A, the sensible heat exchangers 126 and the latent heat exchangers 126a of FIG. 5A have traded places, relative to the first inlet face 132, second inlet face 134, and first and second outlets 138, 136.

FIG. 5B shows an example of a core assembly 220, with sensible heat exchangers 226 and latent heat exchangers 226a. The core assembly 220 includes a first inlet face 232, a second inlet face 234, a first outlet 238, and second outlet 236. In FIG. 5B, the core assembly 220 is in a similar orientation as in FIG. 2A, but in a different orientation relative to the outdoor and exhaust air flows 222, 224. The number of sensible heat exchangers 226 and the latent heat exchangers 226a is relatively more for example there are six (6) sensible heat exchangers 226 and three (3) latent heat exchangers 226a. It will be appreciated that the center heat exchanger 226 or internal heat exchangers for larger numbers (e.g. not exposed to inlet faces or outlets) can be either sensible heat exchangers or latent heat exchangers.

FIG. 5C shows another example of a core 320, but in a different orientation relative to the outdoor and exhaust air flows 322, 324. Different from FIG. 5B, the sensible heat exchangers 326 and the latent heat exchangers 326a of FIG. 5C have traded places, relative to the first inlet face 332, second inlet face 334, and first and second outlets 338, 336. The number of sensible heat exchangers 326 and the latent heat exchangers 326a is relatively more for example there are six (6) sensible heat exchangers 326 and three (3) latent heat exchangers 326a. It will be appreciated that the center heat exchanger 326 or internal heat exchangers for larger numbers (e.g. not exposed to inlet faces or outlets) can be either sensible heat exchangers or latent heat exchangers.

In an embodiment, a heat exchange assembly herein is configured for use in systems and/or units that provide over 1000 cubic feet per minute (cfm) of air flow, provide at or about or over 2000 cfm, provide at or about or over 2300 cfm, and in some instances provide at or about or over 32000 cfm.

In an embodiment, an air handler unit includes an enclosure (e.g. 110) for the heat exchange assembly (e.g. 100). In an embodiment, an air handler unit is a part of a rooftop type of HVAC system.

Figure 6A:
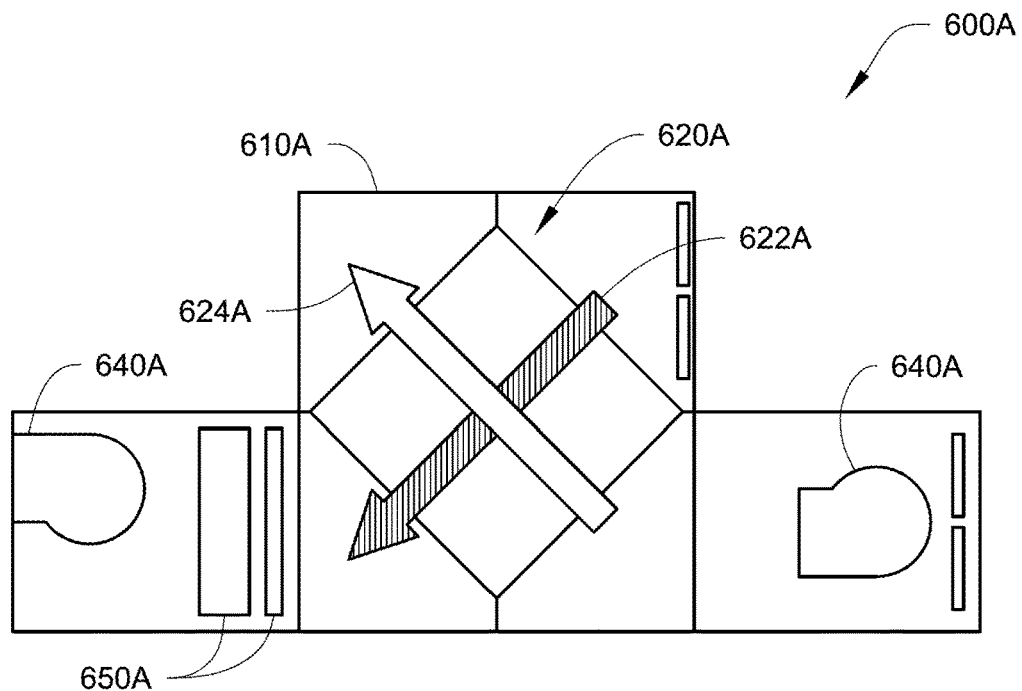
FIGS. 6A to 6B are side plan views showing embodiments of air handler units with a heat exchange assembly and showing air flow through the heat exchange assembly.
Figure 6B:
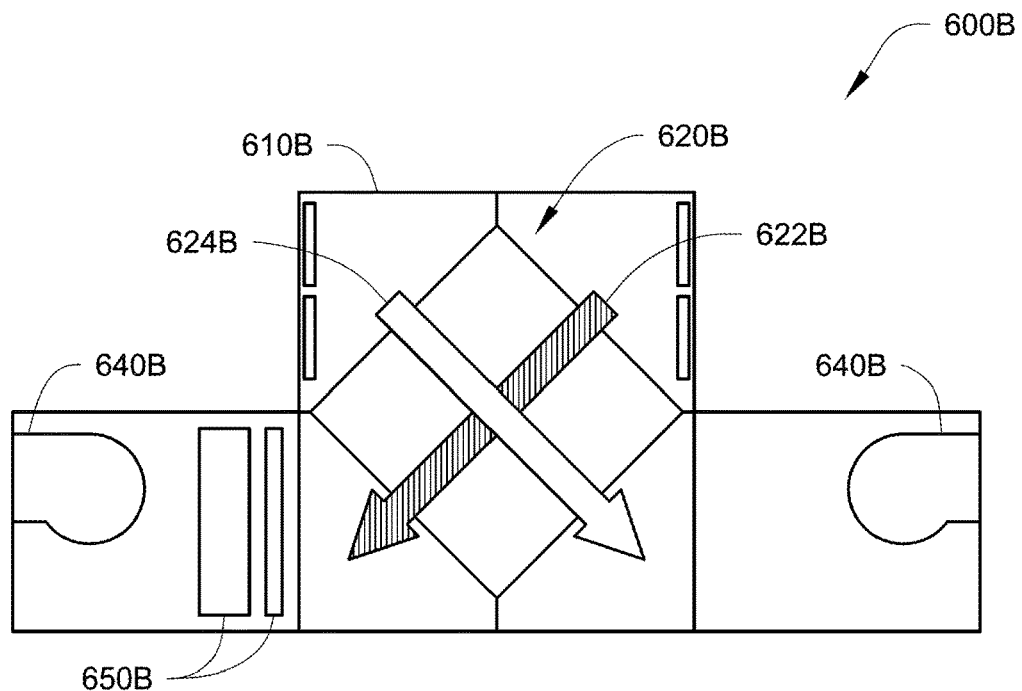

FIGS. 6A and 6B are side plan views showing embodiments of air handler units with various heat exchange assemblies 600A, 600B and showing air flow through the respective heat exchange assemblies.

In FIG. 6A, the heat exchange assembly 600A is part of an air handler unit which includes a heat exchange core assembly 620A and one or more fans 640A to manage return exhaust air 624A and/or deliver supply air through coils or cores 650A (e.g. cooling and/or heating coils or cores). The heat exchange assembly 600A includes an enclosure 610A that houses the heat exchange core assembly 620A, which receives the outdoor air 622A and exhaust air 624A. The orientation of the heat exchange core 620A is of a horizontal-like cross flow of the air streams 622A, 624A.

In FIG. 6B, the heat exchange assembly 600B is part of an air handler unit which includes a heat exchange core assembly 620B and one or more fans 640B to manage return exhaust air 624B and/or deliver supply air through coils or cores 650B (e.g. cooling and/or heating coils or cores). The heat exchange assembly 600B includes an enclosure 610B that houses the heat exchange core assembly 620B, which receives the outdoor air 622B and exhaust air 624B. The orientation of the heat exchange core 620B is of a vertical-like cross flow of the air streams 622B, 624B.

FIGS. 7A to 7D show examples of heat exchange core assemblies.

Figure 7A:
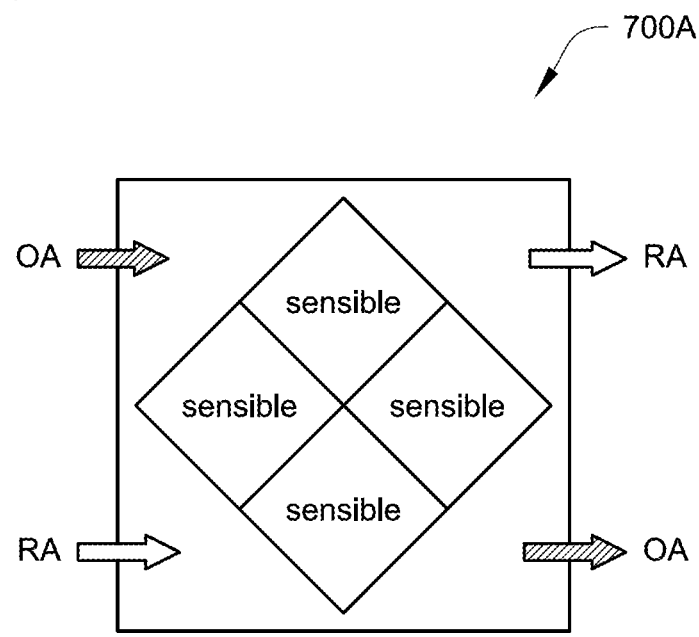
FIG. 7A shows a schematic view of a heat exchange assembly with only sensible heat exchangers.

FIG. 7A shows a schematic view of a heat exchange assembly 700A by comparison with only sensible heat exchangers. In such a design, the energy recovery, particularly latent energy recovery, is insufficient.

Figure 7B:
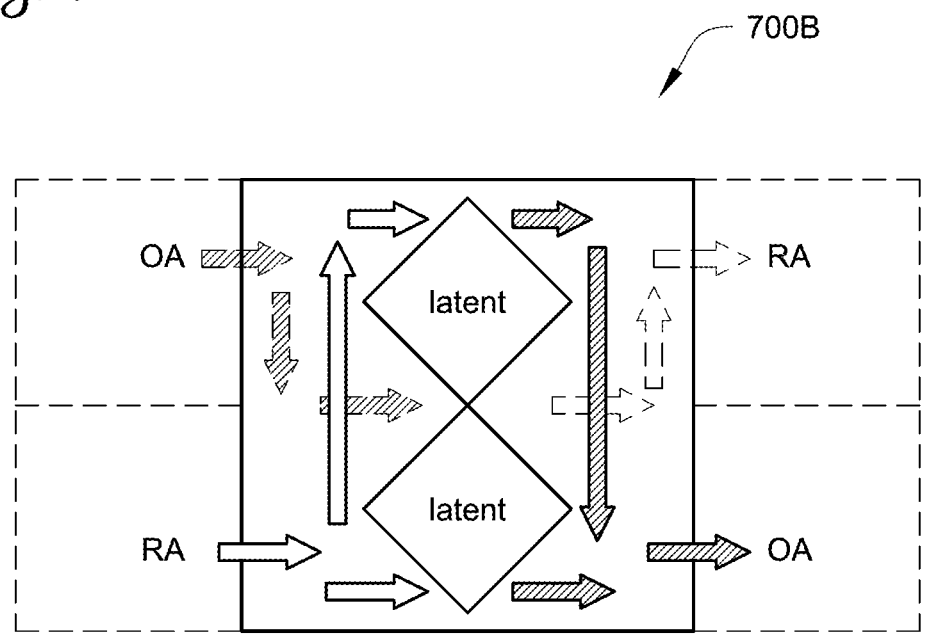
FIG. 7B shows a schematic view of a heat exchange assembly with only latent heat exchangers, including plenums and block-offs.

FIG. 7B shows a schematic view of a heat exchange assembly 700B by comparison with only latent heat exchangers, including plenums and block-offs. In such a design, the unit footprint is significantly larger, may be susceptible to higher pressure drop or losses, and/or may provide limited heat transfer capability, and/or do not allow support for bypass damper in the enclosure of the heat exchange core assembly and on the heat exchange core assembly.

Figure 7C:
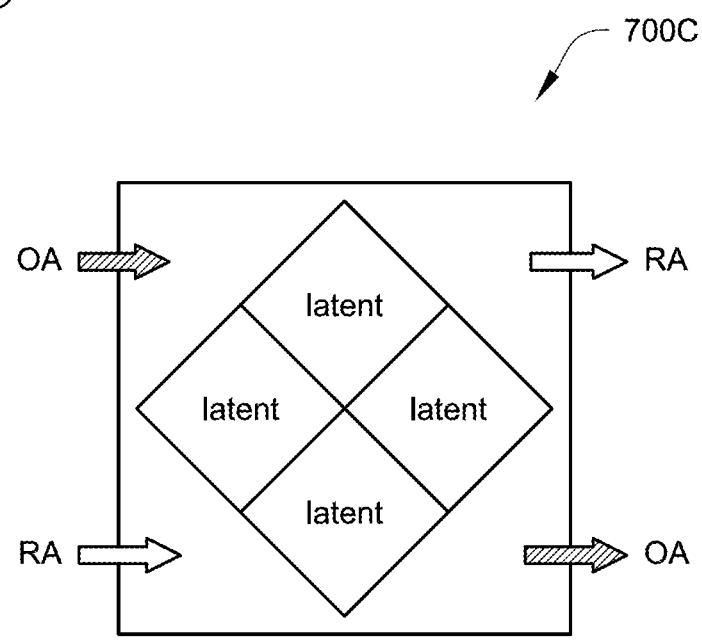
FIG. 7C shows a schematic view of a heat exchange assembly with only latent heat exchangers.

FIG. 7C shows a schematic view of a heat exchange assembly 700C by comparison with only latent heat exchangers. In such as design, the unit may experience relatively higher pressure drop, which may be undesired.

Figure 7D:
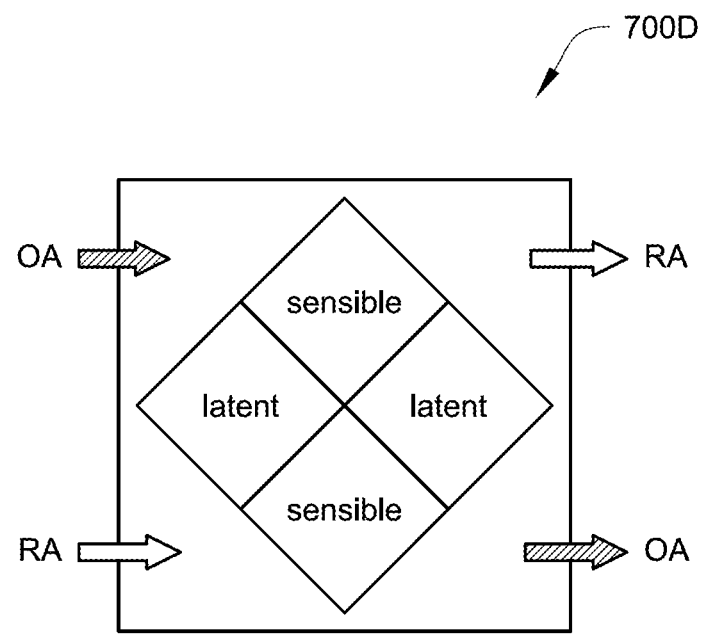
FIG. 7D shows a schematic view of a heat exchange assembly as in FIG. 2B.

FIG. 7D shows a schematic view of an improved heat exchange assembly 700D. In this design, the heat exchange assembly is similar to the improved inventive concepts and designs herein, e.g. as in FIG. 2B.

Condensate Management and/or Frost Prevention

In an embodiment, the one or more sensible heat exchangers (e.g. 126) and one or more latent heat exchangers (e.g. 126a) are arranged and configured to provide condensate management for example to provide frost prevention. In an embodiment, one or more latent heat exchangers is disposed proximate an area the first air stream enters the heat exchange assembly and proximate an area the second air stream exits the heat exchange assembly.

In an embodiment, a heat exchange assembly herein has one or more latent heat exchangers that are structured, configured, and/or arranged to provide condensation and freeze prevention, and to provide reduced frost formation. In an embodiment, the one or more latent heat exchangers provide frost prevention for example at or about −10° F., or at or about 0° F. to at or about −10° F.

In an embodiment, a latent heat exchanger is disposed at a vertex shared by the first inlet face and the second outlet. In an embodiment, a latent heat exchanger is disposed at a vertex shared by the first inlet face and the second inlet face. In an embodiment, a latent heat exchanger is disposed at a vertex shared by the first outlet and the second outlet. In an embodiment, a latent heat exchanger is disposed at a vertex shared by the second inlet face and the first outlet. In an embodiment, the vertex is a location relative to a block arrangement of one or more sensible heat exchangers and one or more latent heat exchangers.

Figure 8A:
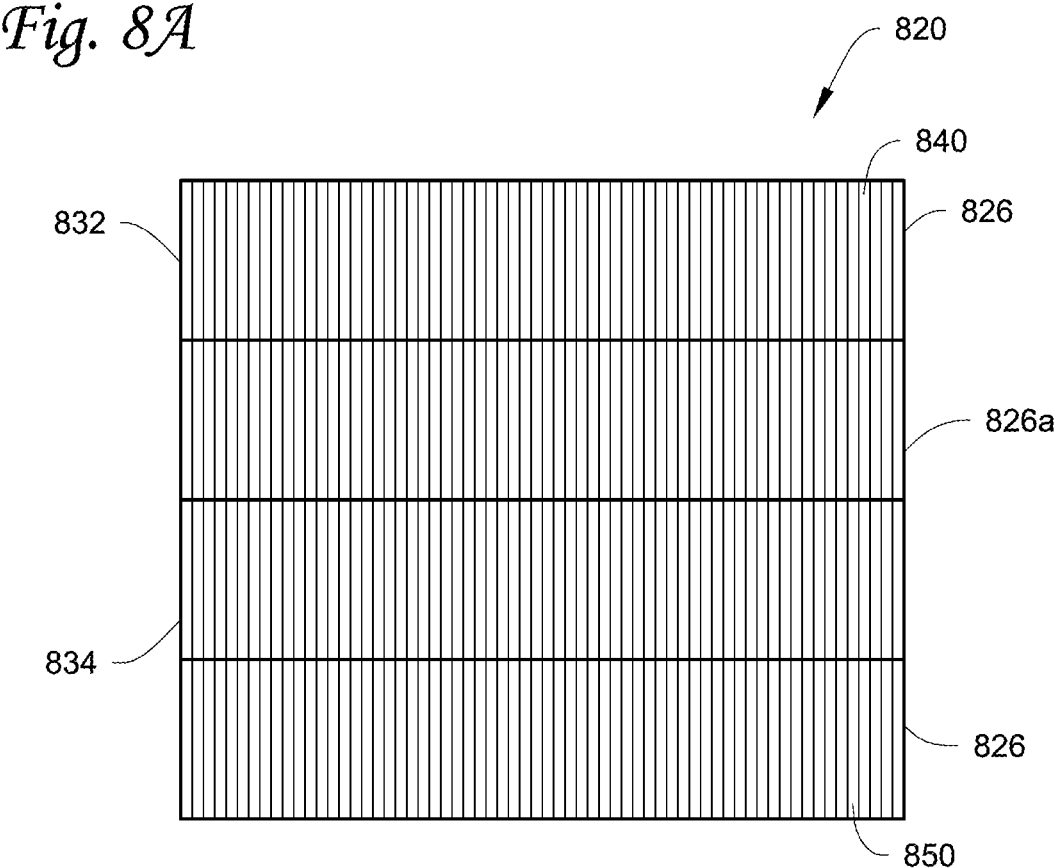
FIG. 8A is a face view of an embodiment of the inlet face of a heat exchange core assembly for frost prevention.
Figure 8B:
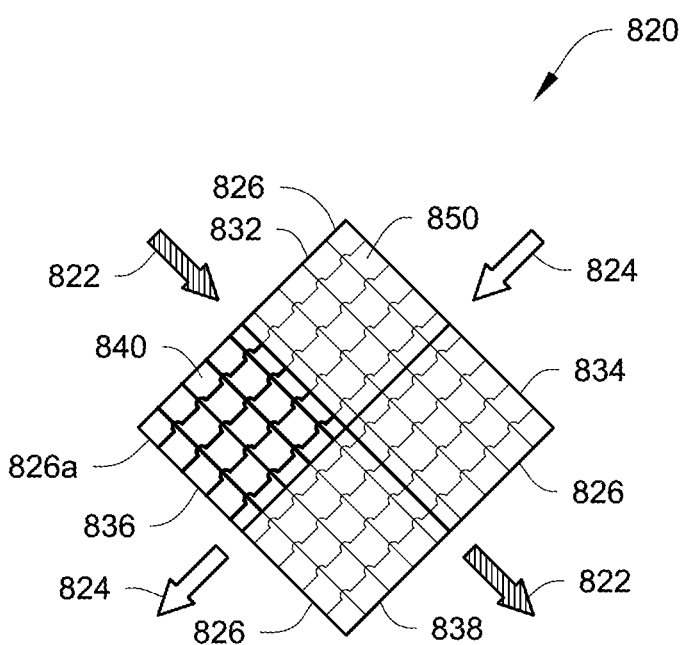
FIG. 8B is a side schematic view of an embodiment of air flow through sensible heat exchangers and a latent heat exchanger configured and arranged for example as in FIG. 8A.

FIGS. 8A to 8B show an example of an arrangement and/or configuration of a heat exchange core assembly 820, which can provide condensate management and/or frost protection.

FIG. 8A is a face view of an embodiment of an inlet face 832, 834 of the heat exchanger core assembly 820. As shown, the heat exchange core assembly 820 includes sensible heat exchangers 826 and latent heat exchangers 826a. The heat exchange core assembly 820 can have similar flow channels 840, 850 as described above, and relative to a first inlet face 832, second inlet face 834, and outlets 838, 836 (see e.g. FIG. 8B for the outlets 838, 836). The air streams 822, 824 (e.g. outdoor air and return exhaust air respectively) are shown in FIG. 8B, where a side schematic view is illustrated of the air flow through the sensible heat exchangers 826 and a latent heat exchangers 826a. As shown in FIG. 8B, the heat exchange core can have a relatively cold area (e.g. cold corner) such as during cold ambient temperatures which are received through the air flow 822 around inlet face 832 and the exit of the air flow 824 around outlet 836. In an embodiment, the cold area (e.g. corner) is at the latent heat exchanger 826a at the first inlet face 832 and the second outlet 836. In an embodiment, the cold area can include the vertex thereof, which includes a portion of some or all of this latent heat exchanger 826a (see e.g. bolded heat exchanger 826a).

Test/Comparative Data

A unit in accordance with the heat exchange assembly configuration of FIGS. 3 and 4 was tested. The unit was installed in an energy recovery ventilator, which can serve a building, such as for example an office space. Performance data was logged under summer-like conditions, which include ambient dew point temperatures consistently above 70 F. This provided a large spread between outdoor and exhaust air conditions for energy recovery and good for measurement of performance.

The following is a comparison summary of using a heat exchange assembly herein versus two current methods used in the industry today to package membrane heat exchangers (enthalpy cores) and in accordance with configurations of FIGS. 7B and 7C. The benefits of the improved heat exchange assemblies herein (e.g. of FIGS. 3 and 4) are highlighted in Table 1 below. Table 2 provides another performance comparison of the heat exchange assembly herein (e.g. of FIGS. 3, 4, and 7D) relative to what is available in the market (e.g. of FIGS. 7B and 7C).

TABLE 1

Exchanger with face velocity of 300 feet per minute (fpm)

| | Heat exchange assembly of FIGS. 3, 4, 7D (1) | Heat exchange assembly of FIG. 7B (2) | Heat exchange assembly of FIG. 7C (3) |
|---|---|---|---|
| Sensible Effectiveness | 75% | 68% | 71% |
| Latent Effectiveness | 40-55%, 50% avg | 37% | 47% |
| Total Effectiveness | 56-65%, 61% avg | 49% | 56% |
| Pressure drop | 0.70 | 1.01 | 1.02 |
| Cost add vs heat exchanger 1 | | 20-30% | 25% |
| Scalability | 50,000 cfm | 10,000 cfm | 5,000 cfm |
| Size comparison to heat exchanger 1 at 300 fpm comparison | | 30% taller and longer | 50% wider |

Benefits of heat exchanger 1 vs current industry methods (heat exchangers 2 and 3)

Pressure Loss: Heat exchanger 1 adds 0.1" of transition losses to exchanger. The other two heat exchangers 2 and 3 add 0.4". The heat exchanger 1 is in a lower size range of where this would be applied, and expect these benefits to be greater at the larger sizes. The pressure drop credit given in ASHRAE standard 90.1 for energy recovery is exceeded by current methods, but heat exchanger 1 is below the credit allowed.

Sensible Heat Recovery Enhancement: For the heat exchanger 1, the "sensible assistance" improvement was 10%, a 7% points over basis.

Latent Heat Recovery Enhancement: Precooling ("sensible assisting") the outside air for the second exchanger enhances latent recovery. In the heat exchanger 1, the membrane's performance has a relationship between relative humidity (RH) and latent recovery. At 300 fpm the latent recovery effectiveness is only 40% at ≤40% RH, but at 90% RH the effectiveness climbs to 55%. This confirms that precooling the outdoor air and raising the relative humidity will increase the latent recovery. To quantify the enhancement one of the membranes was isolated in the heat exchanger 1 to find baseline improvement. Based on recorded data this is estimated at 2-5% point add to latent.

Total Energy Recovery Enhancement: In the heat exchanger 1, the average total energy recovered over the 3-4 week period measured at 300 fpm face velocity was 61%. The prescribed requirements of ASHRAE 90.1 for energy recovery is 50%. This will allow for heat exchanger 1 to be used at a higher face velocity than current methods (e.g. heat exchangers 2 and 3) and still meet the standard requirements.

The heat exchanger 1 provides an excellent performing exchanger relative to those on the market, and also provides advantages of excellent scalability and packaging.

In an embodiment, the heat exchanger assemblies described herein include sensible heat exchangers to fill voids that may be present in the enclosure of the unit. Heat exchanger assemblies herein can avoid the need for transitioning where in some other cases panels and/or block offs are used. Heat exchanger assemblies herein can minimize pressure drop relative to some current designs, minimize footprint, increase heat exchange efficiency, and allow for internal damping within the heat exchanger core enclosure of the unit.

The heat exchanger assemblies described herein can lend to frost prevention benefits. For example, air-to-air fixed-plate heat exchangers are used to reclaim exhaust-air energy as well as to, provide dehumidified ventilation air to a space at room-neutral temperature. It is a sensible-energy recovery device that has alternate layers of plates (e.g. metal, such as aluminum) that are separated and sealed to form passages for the outdoor and exhaust air streams. The hybrid heat exchange assembly designs herein can minimize cross-contamination and relies on thermal conduction to induce heat transfer. It is also easy to clean and service. The fixed-plate surface may be designed to equalize uneven entering airflow as the air travels through the heat exchanger. Air can enter the module on any side, except in some instances the bottom, where drain pan(s) may be present to catch condensate.

In a latent heat exchanger as used in the beat exchange assemblies herein, latent heat exchange is associated with changes of state, for example measured at constant temperature, such as the phase change of atmospheric water vapor, mostly vaporization and condensation, whereas in a sensible heat exchanger, heat exchange directly affects the temperature of the atmosphere. Latent heat, which is the amount of heat exchanged that is hidden, meaning it occurs without change of temperature.

In the heat exchange assemblies herein, a cross flow heat exchange assembly is provided which uses sensible heat exchangers to recover sensible heat from exhaust air and is combined with latent heat exchangers to remove water vapor. For example, the heat exchange assemblies herein can minimize frosting in winter heating and can remove some water vapor from the ventilation air during cooling. As an example, the heat exchange assemblies herein can be used in residential and/or commercial spaces, buildings, and the like. Use in a large commercial application, for example, can save a substantial amount of heating in the winter, and can avert frost formation such as during peak heating hours.

For example, the heat exchange assemblies described herein can be implemented in such commercial buildings with HVAC systems with heating requirements and 2000 cfm or more of ventilation requirement. Such buildings can include but are not limited to schools and other public buildings, but include can include others where there may be a desire and/or need for energy recovery as per American Society of Heating, Refrigerating, and Air-Conditioning Engineers (ASHRAE) standard 90.1.

The heat exchange assemblies described herein can be a hybrid of technologies of air to air exchangers. For example, a sensible plate exchanger is used to recover heat, with a corner of this core consisting of a membrane exchanger that exchanges latent and sensible heat. The heat exchange assembly herein can provide a cross flow exchanger that minimizes frost potential without minimizing the sensible heat transfer. The heat exchange assembly can also add latent energy recovery to reduce humidification loads in the winter and dehumidification loads during the summer.

In an embodiment, the heat exchange assemblies described herein provide a cross flow plate heat exchanger with two distinct portions, a sensible exchanger which may be constructed as metal or plastic plates that exchange sensible heat and an enthalpy plate, e.g. a membrane, that exchanges latent heat, e.g. water vapor, and can also in some circumstances exchange sensible heat. The membrane exchanger portion in some examples may be placed at a relatively high and/or highest point of vapor pressure differential between air streams. In an embodiment, this location can be a corner between the entering outside air and leaving exhaust air. By replacing this corner of the sensible heat exchanger to a latent heat exchanger, latent transfer can occur (e.g. exchange of water vapor), such as where exhaust air may be relatively more susceptible to being humid and where outside air may be relatively cold. This can allow for the benefit of frost avoidance without reducing the sensible performance of the exchanger by other frost avoidance methods or alternatives with added cost of using a complete membrane exchanger. This can also allow for significant amount of dehumidification such as during cooling hours, using in some cases a relatively smaller or minimal portion of the heat exchanger being a latent heat exchanger.

For example, during winter operation of heat exchange assemblies as described herein, outdoor air flows into the cross flow heat exchanger. A portion of the outdoor air enters the latent heat exchanger(s) where water vapor and sensible heat are exchanged between air streams. Water vapor may be removed from the exhaust air stream, such as to the outdoor air stream, to prevent condensing of the exhaust air on a relatively cold surface of the heat exchange assembly. Exhaust air can leave the latent heat exchanger(s), where sensible heat may be transferred through a sensible heat exchanger(s). Another portion of the outdoor air flows through the sensible heat exchanger(s). The converse can happen with the exhaust air energy. Air can flow freely from a latent heat exchanger, e.g. enthalpy membrane portion, to a sensible heat exchanger portion by way of the cross flow structure of the heat exchange assembly.

Heat exchange assemblies described herein can provide a latent heat exchanger, such as for example membrane enthalpy cores, and a sensible heat exchanger, e.g. fixed plate designs, in a combined single cross flow energy heat exchange assembly. The heat exchange assembly herein can provide a cross flow heat exchanger that can minimizes the footprint of a unit, such as an air handler while utilizing membrane energy exchangers and can optimize a relationship of air pressure loss and total energy exchange.

In many past cases, membrane plate exchangers have been sized for less than 1000 cfm of air flow. There are no air conditioning heating and refrigeration institute (AHRI) certified membrane exchangers above 2000 cfm. Current membrane plate exchangers are not easily scalable as their counter parts, metal plate or plastic exchangers which do not transfer water vapor. Metal plate exchangers as they get larger increase the spacing between plates and exchangers are available with AHRI certified performance up to 32,000 cfm. The plate spacing for membrane exchanger may not be easily increased because of manufacturing, structural and performance reasons. When membrane plates are used for more than 1000 cfm airflow, one solution may be to use multiple small exchangers arranged with block offs and plenums. This creates a very large footprint for the equipment overall to allow for the crossing of multiple air paths and also increases transitional pressure losses. Another solution may be to use smaller exchangers together to make a larger cross flow exchanger, but because the spacing between plates is not increased the air pressure increases greatly. Typical air pressures loss for units >2000 cfm can be over 2 inches water column for both the exhaust and outdoor air streams. Because of the large footprint and high pressure losses, membrane exchangers have used various face and bypass control to bypass exchangers when recovery may not be beneficial, which are structures external to the exchanger (e.g. transitions, panels, block offs, and the like).

In an embodiment and different from such past cases, the hybrid air to air exchangers in the heat exchange assemblies as described herein have sensible plate heat exchangers with relatively wider spacing to direct the air to the latent heat exchanger, e.g. membrane plate exchanger. The heat exchange assembly herein can provide a cross flow heat exchange assembly that allows for placement of other air conditioning components (e.g. coils, filters, etc.) directly up and/or downstream of the heat exchange assembly. In such cases, arrangements with transitions and/or block-offs can be avoided, which would increase the footprint required for typical use of membrane exchangers. The heat exchange assemblies herein can also increase the amount of sensible energy recovered, as sensible heat exchangers direct the air through the membrane exchangers to increase the amount of sensible heat transferred between the two airstreams. The heat exchanger assemblies herein can reduce pressure loss relative to other designs, which can increase the relative energy recovery for the amount of fan energy input. The heat exchange assemblies herein can also allow for use of internal face bypass dampers on the heat exchangers of the heat exchange assembly or within the enclosure of the unit, while also allowing use of external bypass air paths to be utilized to allow for proper control.

In an embodiment, a cross flow heat exchange assembly has been shown and described with respect to the heat exchange assembles herein. In an embodiment, such assemblies are of multiple rectangular plate heat exchangers that exchange sensible heat and rectangular enthalpy plates (membrane exchangers i.e. latent heat exchangers) that can also be called cores) that exchange water vapor and sensible heat. The membrane exchangers are arranged such that if airstream goes straight through the exchanger it passes through one membrane (sensible and latent) exchanger. An arrangement of sensible plate exchangers (e.g. made of a metal or plastic) are utilized to direct air through the array of membrane exchanger. Depending on size, each air stream may pass through multiple sensible exchangers (metal or plastic) to get to the membrane cores.

Aspects

Aspects—any of aspects 1-4 may be combined with any of aspects 5-31, and any of aspects 5-26 may be combined with any of aspects 27-31, and any of aspects 27-28 may be combined with any of aspects 29-31, and aspect 29 may be combined with any of aspects 30-31.

Aspect 1. A heat exchange assembly in an air to air heat exchanger, including an arrangement, construction, and/or configuration of a combination of latent heat exchangers and sensible heat exchangers.

Aspect 2. The heat exchange assembly of aspect 1 wherein the air to air heat exchanger is in an air handler of a refrigeration circuit.

Aspect 3. The heat exchange assembly of aspect 1 or 2, wherein the air to air heat exchanger is part of a HVAC system and/or unit.

Aspect 4. The heat exchange assembly of aspect 3 wherein the HVAC system and/or unit is for example a rooftop type of HVAC system and/or unit.

Aspect 5. A heat exchange assembly includes one or more sensible heat exchangers and one or more latent heat exchangers. The one or more sensible heat exchangers and one or more latent heat exchangers are arranged and configured to make up a first inlet face configured to receive a first stream of air. The one or more sensible heat exchangers and one or more latent heat exchangers are configured to make up a second inlet face configured to receive a second stream of air different from the first stream of air. The one or more sensible heat exchangers and one or more latent heat exchangers are configured to make up a first outlet in fluid communication with the first inlet face. The one or more sensible heat exchangers and one or more latent heat exchangers are configured to make up a second outlet in fluid communication with the second inlet face. The one or more sensible heat exchangers and one or more latent heat exchangers include flow channels between the first inlet face and the first outlet, and between the second inlet face and the second outlet. The flow channels between the first inlet face and the first outlet are in a heat exchange relationship with the flow channels between the second inlet face and the second outlet, and are configured such that both sensible heat exchange and latent heat exchange occurs through the heat exchange assembly.

Aspect 6. The heat exchange assembly of aspect 5, wherein one or more of the sensible heat exchangers and one or more of the latent heat exchangers include both the flow channels between the first inlet face and the first outlet and the flow channels of between the second inlet face and the second outlet.

Aspect 7. The heat exchange assembly of aspect 5 or 6, wherein the flow channels between the first inlet face and the first outlet are in a heat exchange relationship with the flow channels between the second inlet face and the second outlet, and are configured such that both sensible heat exchange and latent heat exchange occurs through the flow channels between the first inlet face and the first outlet and through the flow channels between the second inlet face and the second outlet.

Aspect 8. The heat exchange assembly of any of aspects 5 to 7, wherein the first inlet face includes at least one latent heat exchanger exposed, and the second inlet face includes at least one latent beat exchanger exposed.

Aspect 9. The heat exchange assembly of any of aspects 5 to 8, wherein the first outlet includes at least one latent heat exchanger, and the second outlet includes at least one latent heat exchanger.

Aspect 10. The heat exchange assembly of one of aspects 5 to 9, wherein the one or more of the sensible heat exchangers and one or more of the latent heat exchangers are arranged and configured as an assembled block of heat exchangers.

Aspect 11. The heat exchange assembly of any one of aspects 5 to 10, wherein the one or more of the sensible heat exchangers and one or more of the latent heat exchangers are arranged and configured as a combination to respectively include a same number exposed to the first inlet face as exposed to the second inlet face and to respectively include a same number exposed to the first outlet as exposed to the second outlet.

Aspect 12. The heat exchange assembly of any one of aspects 5 to 11, wherein the one or more of the sensible heat exchangers and one or more of the latent heat exchangers are arranged and configured as a mathematically squared number when viewed from a side profile.

Aspect 13. The heat exchange assembly of any one of aspects 5 to 12, wherein the first air stream is outdoor air, the first inlet face is configured to receive the outdoor air.

Aspect 14. The heat exchange assembly of any one of aspects 5 to 13, wherein the second air stream is exhaust air, the second inlet face is configured to receive the exhaust air.

Aspect 15. The heat exchange assembly of any one of aspects 5 to 14, wherein the one or more sensible heat exchangers are constructed as fixed plate heat exchangers with plates that are separated and sealed to form the flow channels therebetween.

Aspect 16. The heat exchange assembly of aspect 15, wherein the fixed plates are metal plates, such as for example aluminum, or plastic or composite plates, where the plate surfaces provide for heat exchange to occur.

Aspect 17. The heat exchange assembly of any one of aspects 5 to 16, wherein the one or more latent heat exchangers are constructed as plates, layers, or membranes that are separated and sealed to form the flow channels therebetween. The plates, layers, membranes, or the like are configured to include permeable surfaces that promote molecular transfer of water vapor from one side of the plate to another side of the plate.

Aspect 18. The heat exchange assembly of aspect 17, wherein the one or more latent heat exchangers include corrugations between the layers that provide additional channels within the flow channels between the layers.

Aspect 19. The heat exchange assembly of any one of aspects 5 to 18, wherein the one or more sensible heat exchangers and one or more latent heat exchangers are arranged and configured to provide condensate management for example to provide frost prevention.

Aspect 20. The heat exchange assembly of any one of aspects 5 to 19, wherein one or more latent heat exchangers is disposed proximate an area the first air stream enters the heat exchange assembly and proximate an area the second air stream exits the heat exchange assembly.

Aspect 21. The heat exchange assembly of any one of aspects 5 to 20, wherein the one or more latent heat exchangers provide frost prevention for example to at or about −10° F., at or about 0° F. to at or about −10° F.

Aspect 22. The heat exchange assembly of any one of aspects 5 to 21, wherein one or more of the latent heat exchangers is disposed at a vertex shared by the first inlet face and the second outlet.

Aspect 23. The heat exchange assembly of any one of aspects 5 to 21, wherein one or more latent heat exchangers is disposed at a vertex shared by the first inlet face and the second inlet face.

Aspect 24. The heat exchange assembly of aspect 22 or 23, wherein the vertex is a location relative to a block arrangement of one or more sensible heat exchangers and one or more latent heat exchangers.

Aspect 25. The heat exchange assembly of any one of aspects 5 to 24, wherein one or more of the inlet face and the outlet face includes a bypass damper thereon.

Aspect 26. The heat exchange assembly of any one of aspects 5 to 25, wherein the heat exchange assembly is configured for use in systems and/or units that provide over 1000 cubic feet per minute (cfm) of air flow, provide at or about or over 2000 cfm, provide at or about or over 2300 cfm, and in some instances provide at or about or over 32000 cfm.

Aspect 27. An air handler unit includes an enclosure for the heat exchange assembly of any one or more of aspects 1 to 26.

Aspect 28. The air handler unit of aspect 27, wherein the air handler unit is a part of a rooftop type of HVAC system.

Aspect 29. A method of flowing streams of air through a heat exchange assembly includes directing a first and a second air stream to promote heat exchange through flow passages in a heat exchange assembly as per any one or more of aspects 1 to 28.

Aspect 30. A method for preventing frost on a heat exchange assembly includes directing a first and a second air stream to promote heat exchange through flow passages in a heat exchange assembly as per any one or more of aspects 1 to 28.

Aspect 31. The method of aspect 30 including managing condensate proximate the first inlet face and the second outlet.

The invention claimed is:

1. An air to air heat exchange assembly, comprising:
a plurality of sensible heat exchangers; and
a plurality of latent heat exchangers,
the plurality of sensible heat exchangers and the plurality of latent heat exchangers are arranged and configured so that at least a first of the plurality of sensible heat exchangers and a first of the plurality of latent heat exchangers make up a first inlet face configured to receive a first stream of air,
the plurality of sensible heat exchangers and the plurality of latent heat exchangers are configured to make up a second inlet face configured so that one of:
the first of the plurality of sensible heat exchangers and a second of the plurality of latent heat exchangers receive a second stream of air different from the first stream of air, wherein the first stream of air flows in series through the first of the plurality sensible heat exchangers and the second of the plurality of latent heat exchangers, or
a second of the plurality of sensible heat exchangers and the first of the plurality of latent heat exchangers receive a second stream of air different from the first stream of air, wherein the first stream of air flows in series through the first of the plurality latent heat exchangers and the second of the plurality of sensible heat exchangers, or
a second of the plurality of sensible heat exchangers and a second of the plurality of latent heat exchangers receive a second stream of air different from the first stream of air, wherein the first stream of air flows in series through the first of the plurality sensible heat exchangers and the second of the plurality of latent heat exchangers,
the plurality of sensible heat exchangers and the plurality of latent heat exchangers are configured to make up a first outlet in fluid communication with the first inlet face, the first inlet face being parallel to the first outlet,
he plurality of sensible heat exchangers and the plurality of latent heat exchangers are configured to make up a second outlet in fluid communication with the second inlet face, the second inlet face being parallel to the second outlet,
the plurality of sensible heat exchangers and the plurality of latent heat exchangers include flow channels between the first inlet face and the first outlet, and between the second inlet face and the second outlet, and the flow channels between the first inlet face and the first outlet are in a heat exchange relationship with the flow channels between the second inlet face and the second outlet, and are configured such that both sensible heat exchange and latent heat exchange occurs through the heat exchange assembly.

2. The heat exchange assembly of claim 1, wherein a sensible heat exchanger of the plurality of sensible heat exchangers or a latent heat exchanger of the plurality of latent heat exchangers includes both the flow channels between the first inlet face and the first outlet and the flow channels between the second inlet face and the second outlet.

3. The heat exchange assembly of claim 1, wherein the first inlet face includes at least one latent heat exchanger exposed, and the second inlet face includes at least one latent heat exchanger exposed.

4. The heat exchange assembly of claim 1, wherein the first outlet includes at least one latent heat exchanger, and the second outlet includes at least one latent heat exchanger.

5. The heat exchange assembly of claim 1, wherein the plurality of sensible heat exchangers and the plurality of latent heat exchangers are arranged and configured as an assembled block of heat exchangers.

6. The heat exchange assembly of claim 1, wherein the plurality of sensible heat exchangers and the plurality of latent heat exchangers are arranged and configured as a combination to respectively include a same number of the plurality of sensible heat exchangers and the plurality of latent heat exchangers exposed to the first inlet face as exposed to the second inlet face and to respectively include a same number of the plurality of sensible heat exchangers and the plurality of latent heat exchangers exposed to the first outlet as exposed to the second outlet.

7. The heat exchange assembly of claim 1, wherein the plurality of sensible heat exchangers and the plurality of latent heat exchangers are arranged and configured as a mathematically squared number greater than 1 of the plurality of sensible heat exchangers and the plurality of latent heat exchangers when viewed from a side profile.

8. The heat exchange assembly of claim 1, wherein the first stream of air is outdoor air, the first inlet face is configured to receive the outdoor air.

9. The heat exchange assembly of claim 1, wherein the second stream of air is exhaust air, the second inlet face is configured to receive the exhaust air.

10. The heat exchange assembly of claim 1, wherein the plurality of sensible heat exchangers are constructed as fixed plate heat exchangers with plates that are separated and sealed to form the flow channels there between.

11. The heat exchange assembly of claim 10, wherein the fixed plates are a metal, a plastic, or a composite.

12. The heat exchange assembly of claim 1, wherein the plurality of latent heat exchangers are constructed as plates, layers, or membranes that are separated and sealed to form the flow channels there between,
the plates, layers, or membranes are configured to include permeable surfaces that promote molecular transfer of water vapor from one side to another side thereof.

13. The heat exchange assembly of claim 1, wherein the plurality of latent heat exchangers include corrugations that provide additional flow channels within the flow channels.

14. The heat exchange assembly of claim 1, wherein the plurality of sensible heat exchangers and the plurality of latent heat exchangers are arranged and configured as a combination to provide frost prevention to at or about $-10°$ F., at or about $0°$ F., or from $0°$ F. to $-10°$ F.

15. The heat exchange assembly of claim 1, wherein a latent heat exchanger of the plurality of latent heat exchangers is disposed proximate an area the first air stream enters the heat exchange assembly and proximate an area the second air stream exits the heat exchange assembly.

16. The heat exchange assembly of claim 15, wherein the latent heat exchanger of the plurality of latent heat exchangers is disposed at a vertex shared by the first inlet face and the second outlet.

17. The heat exchange assembly of claim 1, wherein a latent heat exchanger of the plurality of latent heat exchangers is disposed at a vertex shared by the first inlet face and the second inlet face.

18. The heat exchange assembly of claim 1, further comprising a damper on one of the first the inlet face and the second inlet face, the damper configured to block off a portion of the plurality of sensible heat exchangers and/or the plurality of latent heat exchangers.

19. A method of flowing streams of air through an air to air heat exchange assembly, comprising
respectively directing the first stream of air and the second stream of air through the flow channels to promote heat exchange through the flow channels in the heat exchange assembly of claim 1.

20. A method for preventing frost on an air to air heat exchange assembly, comprising
respectively directing the first stream of air and the second stream of air through the flow channels to promote heat exchange through the flow channels in the heat exchange assembly of claim 1; and
managing condensate on the heat exchange assembly of claim 1 by respectively directing the first stream of air and the second stream of air proximate the first inlet face and the second outlet, which includes one of the plurality of latent heat exchangers.

* * * * *